Jan. 25, 1966 W. B. TILL 3,231,295
ANTI-JACKKNIFING DEVICE FOR TRACTOR-TRAILERS
Filed May 15, 1964
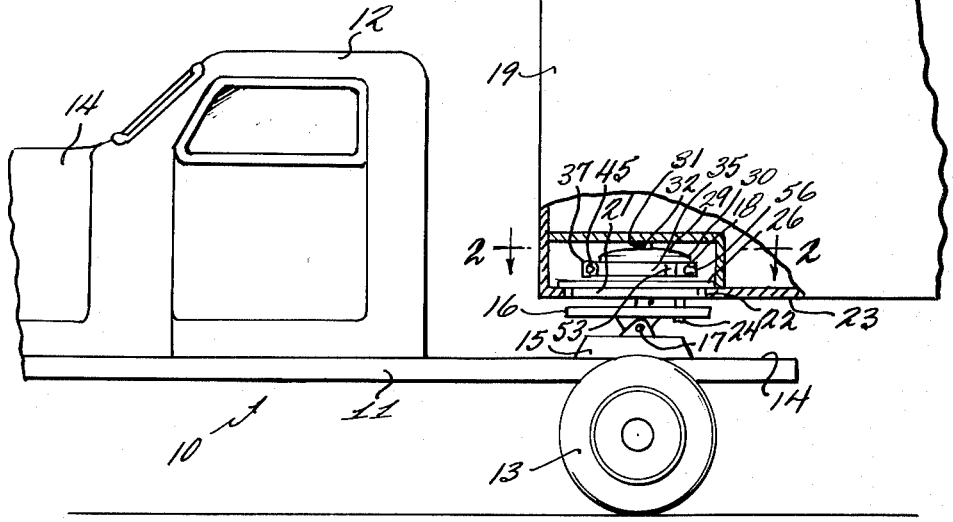
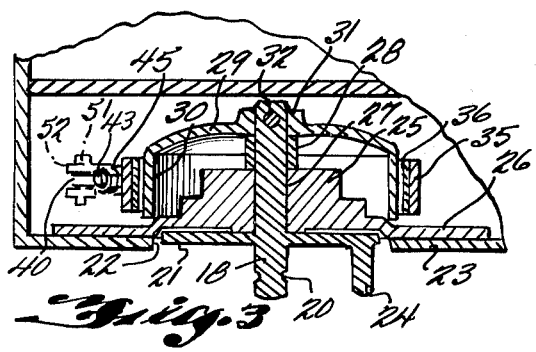
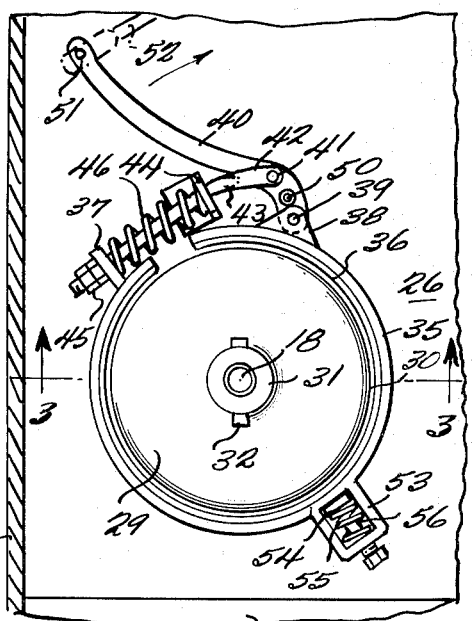
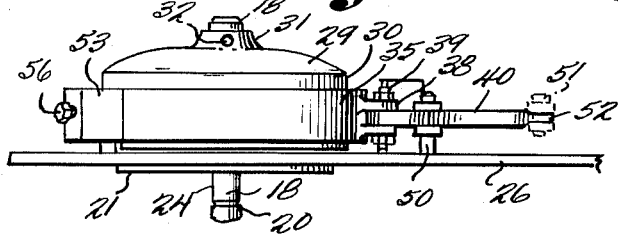
INVENTOR
WILLIAM B. TILL
BY
John B. Dickman III
AGENT

United States Patent Office 3,231,295
Patented Jan. 25, 1966

3,231,295
ANTI-JACKKNIFING DEVICE FOR
TRACTOR-TRAILERS
William Bryan Till, 335 Elza Drive, Oak Ridge, Tenn.
Filed May 15, 1964, Ser. No. 367,708
7 Claims. (Cl. 280—432)

This invention relates to an anti-jackknifing device, and has particular applicability to articulated tractor-trailer vehicles wherein the trailer is connected to the tractor by a fifth wheel, the arrangement being such that the trailer may normally pivot relative to the tractor when making turns or the like.

Heretofore, difficulty has been encountered in such vehicles in what is termed "jack-knifing," that is, in a situation wherein the rear end of the trailer vehicle is traveling faster than the forward end, or the tractor, and swings angularly relative to the tractor about the pivot formed by the fifth wheel. This jackknifing may be occasioned by brake failure, unequal pressure, slippery road surface and skidding, or other related causes, and frequently results in serious accidents. The articulated connection between the trailer and tractor is necessary, particularly in the case of long trailers, to negotiate turns successfully, to aid in parking and maneuvering the vehicle in constricted places, and for other reasons, and in consequence cannot be dispensed with. However, when the fifth wheel is free to turn completely as above discussed, jackknifing may occur.

It is a primary object of this invention, therefore, to provide brake means connected with and operable by the normal braking of the vehicle which will apply commensurate braking power to the turning movement of the fifth wheel so that, in effect, upon sudden stops, the normal aligned relationship of the tractor and trailer will be maintained to preclude jackknifing.

Another object of the invention is to provide such means which will apply gradually increasing pressure in accordance with the brake pressure so that a certain amount of pivotal movement is permitted during normal vehicular travel.

A more specific object of the invention is the provision of an anti-jackknifing device in accordance with the foregoing which includes a brake drum normally rotatable with the lower plate carried by the trailer unit and connected to the tractor fifth wheel which is adapted to be engaged by a brake shoe so that upon application of the vehicle brakes the relative pivotal movement between the trailer unit and the tractor unit is increasingly resisted and ultimately upon final application of brake pressure, precluded entirely.

A further object of the invention is the provision of a device of this character which may be applied to currently existing vehicles with a minimum of expense, time and difficulty, or which may be conveniently built into new units with a minimum increase in overall cost.

Still another object of the invention is the provision of a device of this character which is sturdy and durable in construction, reliable and efficient in operation, and which is simple and easy to install, operate, and maintain.

Other objects will in part be pointed out hereinafter and disclosed in the accompanying drawing wherein there is shown a preferred embodiment of this inventive concept.

In the drawing:

FIGURE 1 is a side elevational view, partially broken away, of a tractor-trailer combined unit, showing the relative positioning and connection of the fifth wheel, and disclosing in section the anti-jackknifing device of the instant invention.

FIG. 2 is an enlarged sectional view taken substantially along the line 2—2 of FIG. 1 as viewed in the direction indicated by the arrows.

FIG. 3 is a sectional view taken substantially along the line 3—3 of FIG. 2 as viewed in the direction indicated by the arrows, and FIG. 4 is a side elevational view of the brake drum and braking mechanism removed from its associated housing.

Similar reference characters refer to similar parts throughout the several views of the drawing.

Having reference now to the drawings in detail, and more particularly to FIG. 1, there is generally indicated at 10 a conventional tractor vehicle of any desired type, including a frame 11 a cab 12 and drive wheels 13, the latter driven in conventional manner by a motor contained under the hood 14. The tractor carries on the flat rear end 11a of the frame 11 a mounting 15, which in turn carries a fifth wheel assembly 16 of conventional design mounted on a transverse horizontal pivot pin 17. The fifth wheel includes the usual slot and center opening for the reception of a kingpin 18, which is carried by the trailer vehicle 19, the latter being of any desired conventional type. The kingpin 18 is provided with a groove 20, which is adapted to engage suitable fastening means for securing the same within the central opening of the fifth wheel 16, in conventional manner.

In accordance with the instant invention, the kingpin carries integrally therewith, or suitably affixed thereto, a disc 21, which is rotatable in an opening 22 in the bottom 23 of the trailer 19. The disc 21 carries at a peripheral point on its underside a supplementary pin 24, which is engageable in the slot of the fifth wheel, the arrangement being such that the disc and kingpin comprise a pivot, about which the trailer 19 may swing. The pin 24 is mounted for rotation in a boss 25 carried by a mounting plate 26 interiorly of the trailer body, and extends completely through a central bore 27. At its upper end the kingpin is surrounded by a bushing 28 which serves to support a cylindrical brake drum 29 having an annular depending flange 30 and a central boss 31. The boss 31 is fixedly secured to the top of the kingpin 18 in any desired manner, as by a locking pin 32 or other analogous means. The annular braking flange 30 of brake drum 29 is surrounded by a split brake shoe 35 provided with the conventional brake lining 36, the brake shoe carrying adjacent one end an apertured lug 37, and adjacent its other end a pair of spaced ears 38. The ears are apertured to receive a pivot pin 39 which extends through the end of a braking lever 40, the latter having pivotally connected to an intermediate point thereof, as by means of a pivot pin 41, the forked end 42 of a brake operating rod 43. The latter extends through an opening in an upright lug 44 fixed to the mounting plate 26 and thence through the opening or aperture in lug 37, being secured in position in any desired manner as by means of nuts 45. A compression spring 46 surrounds rod 43 between the lugs 37 and 44 and serves normally to bias the split ends of the brake shoe outwardly out of contact with the flange 30.

Brake lever 40 is pivotally mounted on a fixed pivot pin 50 which is mounted on plate 26, the pivotal connections 39 and 41 being on opposite sides of the pin 50 so that pressure exerted on the brake rod in the direction indicated by the arrow in FIG. 2 will cause movement of the split ends of the brake shoe toward each other to clampingly engage the brake lining 36 with the flange 30 of the brake drum. The lever 40 is connected at its outer end by means of the pivot 51 to an operating rod 52 which is in turn connected with the brake mechanism of the tractor vehicle in any desired conventional manner, the arrangement being such that application of the brakes of the tractor and consequently those of the trailer which are connected thereto in the usual manner, causes movement of the operating rod 52 in the direction indicated by the arrows to clamp the brake shoe about the brake drum.

The portion of the brake shoe 35 diametrically opposed to the split ends thereof is provided with a rectangular box-like extension 53, which engages over a lug 54 carried by mounting plate 26, and which contains a compression spring 55 which surrounds the end of the screw 56, which extends through a threaded opening in the wall of portion 53. The arrangement is such that spring 55 serves normally to urge brake shoe 35 out of contact with braking flange 30, and the screw 56 may be adjusted to vary the pressure exerted by the spring.

From the foregoing the operation of the device should now be readily understandable. During normal forward travel of the vehicle the trailer body 19 is free to swing about the kingpin 18 and its associated plate 21 in the usual manner, it being noted that suitable bearings may be provided about the kingpin within the bore 27 if desired. However, when the brakes are applied, movement of the brake lever 40 causes contraction of the brake shoe 35 lightly to engage the flange 30, the brake lining allowing normal frictional slippage. However, sudden full application of the brakes will clamp the brake shoe 35 tightly about the brake flange 30 effectively locking the kingpin 18 and its associated flange against rotation. Since the flange or disc 21 is locked to the fifth wheel plate 16 by the engagement of supplementary pin 24 in the slot of the fifth wheel, the trailer is effectively precluded from swinging out of alignment with the tractor, and the possibility of jackknifing is substantially obviated.

From the foregoing it will now be seen that there is herein provided an improved anti-jackknifing device which accomplishes all of the objects of this invention, and others, including many advantages of great practical utility and commercial importance.

As many embodiments may be made in this inventive concept, and as many modifications may be made in the embodiment hereinbefore shown and described, it is to be understood that all matter herein is to be interpreted merely as illustrative and not in a limiting sense.

I claim:

1. An anti-jackknifing device for tractor-trailer units in which the tractor unit is provided with a lower plate having a rearwardly extending slot communicating with the rear edge thereof, said device comprising a plate adapted to engage the lower plate, said plate being rotatably mounted on the trailer unit for surface engagement with the lower plate on the tractor unit, a centrally disposed depending kingpin on the rotatable plate for engagement with the lower plate, a depending lock pin on the rotatable plate in spaced relation to the kingpin and received in the slot in the lower plate for locking the rotatable plate non-rotatively to the lower plate for movement therewith, and brake means engageable with the rotatable upper plate for resisting rotation thereof, said kingpin extending through said rotatable plate and including a vertically extending upright portion, support means for said upright portion, a brake drum rigidly affixed to the upright portion, and brake shoe means engageable with the brake drum for frictionally engaging the brake drum, said brake drum and brake shoe means forming the brake means for retarding rotation of the rotatable plate, said brake means adapted to be operated in response to application of the brakes of the tractor-trailer unit.

2. The structure as defined in claim 1 wherein said brake shoe means includes an external split brake shoe expanding inwardly for frictional clamping engagement with the brake drum, and means engaged with the free ends of the brake shoe for decreasing the diameter of the brake shoe for frictional engagement with the brake drum.

3. The structure as defined in claim 2 wherein said means engaged with the free ends of the brake shoe includes a brake lever with means thereon connected with the free ends of the brake shoe for moving the brake shoe ends outwardly in one direction of rotation and moving them inwardly for clamping engagement with the brake drum in the other direction of rotation, said brake lever having a laterally extending arm rigid therewith, and operating means connected with the arm for operating the brake lever thus operating the brake shoe.

4. The structure of claim 2 wherein said means engaged with the free ends of the brake shoe includes a brake lever pivotally mounted on the trailer unit adjacent one end of said brake shoe at a point intermediate its ends, a pivotal connection between one end of said lever and one split end of said brake shoe, a pivotal connection between the other end of said lever and an operating rod adapted to be operatively connected to the brake system of the tractor unit, a brake rod pivotally connected at one end to said brake lever adjacent its pivotal mounting and between said pivotal mounting and said other end of said brake lever, an apertured lug fixedly mounted on the trailer unit through which said brake rod extends, a lug secured to the other split end of said brake shoe, means connecting the other end of said brake rod to said last mentioned lug whereby movement of said brake lever in one direction moves said split ends of said brake shoe towards clamping engagement with said brake drum.

5. The structure of claim 4 wherein spring means interposed between said first mentioned lug and said second mentioned lug normally bias the split ends of said brake shoe apart.

6. The structure of claim 5 wherein a third lug is mounted on said trailer unit adjacent said brake shoe at a point opposite the split end thereof, an offset box-like extension of said brake shoe surrounds said third lug, and a compression spring is positioned between said third lug and the outer side of said extension normally biasing that portion of the brake shoe away from the brake means.

7. The structure of claim 6 wherein an adjusting screw extends through a threaded aperture in the outer end of said extension and engages the end of said compression spring for varying the tension thereof.

References Cited by the Examiner
UNITED STATES PATENTS

| | | | |
|---|---|---|---|
| 1,078,801 | 11/1913 | Munsing | 280—432 |
| 2,130,004 | 9/1938 | Fusetti et al. | 280—432 |
| 2,213,221 | 9/1940 | Johnson | 280—432 |
| 2,499,013 | 2/1950 | Wood | 280—432 |
| 2,692,145 | 10/1954 | Hammond et al. | 280—432 |

LEO FRIAGLIA, *Primary Examiner.*